(12) United States Patent
Britt

(10) Patent No.: US 6,298,044 B1
(45) Date of Patent: Oct. 2, 2001

(54) METHOD AND APPARATUS FOR DETERMINING IF OVERLOADED COLLISION DOMAINS CAN BE SPLIT TO ENHANCE NETWORK

(75) Inventor: Julie A. Britt, Roseville, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/053,138

(22) Filed: Mar. 31, 1998

(51) Int. Cl.[7] ........................................................ H04J 3/02
(52) U.S. Cl. ........................ 370/252; 709/224; 709/226; 370/255; 370/400
(58) Field of Search ............................ 370/252, 254, 370/256, 229, 237, 400, 401, 232, 255, 257, 445, 446, 447; 709/235, 239, 242, 248, 249, 223, 224, 226

(56) References Cited

U.S. PATENT DOCUMENTS

| | | | |
|---|---|---|---|
| 5,450,408 | 9/1995 | Phaal | 370/85.13 |
| 5,598,532 | 1/1997 | Liron | 395/200.01 |
| 5,640,384 | 6/1997 | Du | 370/221 |
| 5,712,981 | * 1/1998 | McKee et al. | 370/229 |
| 5,881,048 | 3/1999 | Croslin | 370/228 |

* cited by examiner

Primary Examiner—Ricky Ngo
Assistant Examiner—Frank Duong
(74) Attorney, Agent, or Firm—Denise A. Lee

(57) ABSTRACT

The present invention provides an optimization tool that utilizes traffic data across collision domain boundaries to provide suggestions as to how the network should be changed to achieve an optimal network topology. The optimization tool identifies collision domains that are reaching their peak capacity and analyzes their traffic pattern data to determine whether these over utilized collision domain should be divided into smaller collision domains. Once traffic data is collected, the steps typically implemented by the optimization algorithm to determine the optimal network topology include: identifying and removing global talkers from the analysis; creating workgroups based on the network traffic patterns; for each workgroup, deleting any nodes that do not reside on the same collision domain as the rest of the nodes in that workgroup; analyzing the workgroups of each collision domain; inserting previously removed global talkers back into the analysis; and analyzing the global talkers.

20 Claims, 17 Drawing Sheets

METHOD AND APPARATUS FOR DETERMINING IF OVERLOADED COLLISION DOMAINS CAN BE SPLIT TO ENHANCE NETWORK

BACKGROUND OF THE INVENTION

Network administrators are charged with the task of the design, support and expansion of a new or existing network topology. When problems with the network occur, network administrators must quickly and efficiently diagnose and eliminate the problem in order to reduce network downtime of the end users. Network performance can suffer for a variety of reasons, the most basic of which is an inefficient layout of the network topology. For example, as networks grow it is common for the network administrator to migrate end nodes that talk together to the same collision domain without thought of overall network optimization. As a result, it is easy for some collision domains to become overloaded with traffic while other collision domains in the network are under utilized.

Other reasons for a poor network design include: (1) a network being handed down from administrator to administrator, each administrator adding to the network on a piecemeal basis, without thought to the overall system design, (2) a poor initial base network design, (3) lack of proper equipment, and/or (4) lack of knowledge and training of the network administrator. Poor network design can have devastating effects on the productivity of the system users. Allowing the network to be expanded from a poor base design simply compounds the problem.

Today's network administrators have a plethora of technologies to help collect data illustrating the traffic patterns on the network. One tool used by network administrators to collect data is a LAN analyzer. Technologies including HP EASE and RMON may also be used to collect traffic pattern data. However, although current technologies provide useful information, they do not provide an analysis of the traffic pattern data that illustrate and recommend to the network administrator the best way to reorganize end nodes to achieve increased performance.

Although traffic data collected, for example by the LAN analyzer, is useful the amount of data output is so large, it often requires significant efforts by the network administrator to wade through, decipher and analyze. Because the industry trend is to have fewer network administrators survey more and more complex network topologies, network administrators will often not have an intimate understanding of the network topology. Further, a network administrator is often taking over a network previously supported by another network administrator and does not have the time to do complex network analysis. Current data collection applications provide no suggestion to network administrators as to how and when collision domains in the network topology should be split to optimize network performance. An optimization tool that interprets this data and suggests how the network should be changed to achieve an optimal network topology is needed.

SUMMARY OF THE INVENTION

The present invention provides an optimization tool that utilizes traffic data across collision domain boundaries to provide suggestions as to how the network should be changed to achieve an optimal network topology. The optimization tool identifies collision domains that are reaching their peak capacity and analyzes their traffic pattern data to determine whether these over utilized collision domain should be divided into smaller collision domains.

Because interconnecting devices such as bridges, routers, and switches may be store and forward devices that increase the latency of traffic passing through them, traffic crossing these devices should be kept to a minimum. As a result, the optimization tool ensures that in reducing utilization by dividing a collision domain into two or three smaller collision domains that other network problems are not introduced such as delays being caused by traffic spanning a switch. Also provided are other performance-improving suggestions for collision domains that cannot be subdivided.

Once traffic data is collected, the steps implemented by the optimization tool to determine the optimal network topology include: identifying and removing global talkers that are not inextricably tied to another node; creating workgroups based on traffic patterns; and inserting previously removed global talkers back into the analysis.

Global talkers are nodes whose traffic is dispersed among many different collision domains. The purpose of identifying the global talkers is that global talkers should be placed on a collision domain of their own on a faster speed media. Because placement of global talker nodes is already determined, global talkers are removed from the analysis before further network optimization analysis occurs. There is one exception to this rule, in the case where a global talker has a node inextricably tied to it, the global talker is not removed. In this case, placing the global talker on its own dedicated port is not efficient since the node tied to the global talker is so heavily dependent on it, that nearly all of its traffic will cross a bridge, switch, or router.

After removal of the global talkers, the next step in the optimization process is the creation of workgroups. Workgroups are logical groupings of nodes that talk to one another. Further, a workgroup is tied to a particular collision domain. To group the nodes into workgroups, dependencies need to be explicitly drawn.

One dependency considered is traffic flow between a node under consideration and the node that it talks to. A node is considered to have an owner if more than half its total traffic is directed to or from that owner. When creating workgroups, a node should be placed in the same workgroup as its owner.

Also when determining whether or not a collision domain can be divided into its workgroups, compare the amount of traffic on each workgroup to the amount of internal traffic on the collision domain. The reason for this determination is that if we decide to split this collision domain, we want the collision domain's traffic to be reasonably dispersed among the newly created collision domains. Otherwise, one of the new collision domains may get overloaded in a fairly short period of time.

If it has been determined that a collision domain cannot be split into new collision domains, either because only one workgroup has been identified on it, or because the two workgroups that were identified either didn't distribute the original traffic evenly or caused too much traffic between them, the next step is to consider alternatives to splitting a collision domain. There are two such alternatives: upgrade the collision domain's speed or move the whole collision domain to a desktop switch.

The optimization tool frees the network administrator from the tedious manual analysis of data. In essence, all analysis is implemented behind the scenes with a network-wide rather than a collision domain wide view and the final conclusions are laid out for the user.

A further understanding of the nature and advantages of the present invention may be realized with reference to the remaining portions of the specification and the attached drawings.

DETAILED DESCRIPTION OF THE PREFERRED EMBODIMENTS

Figure 1A:
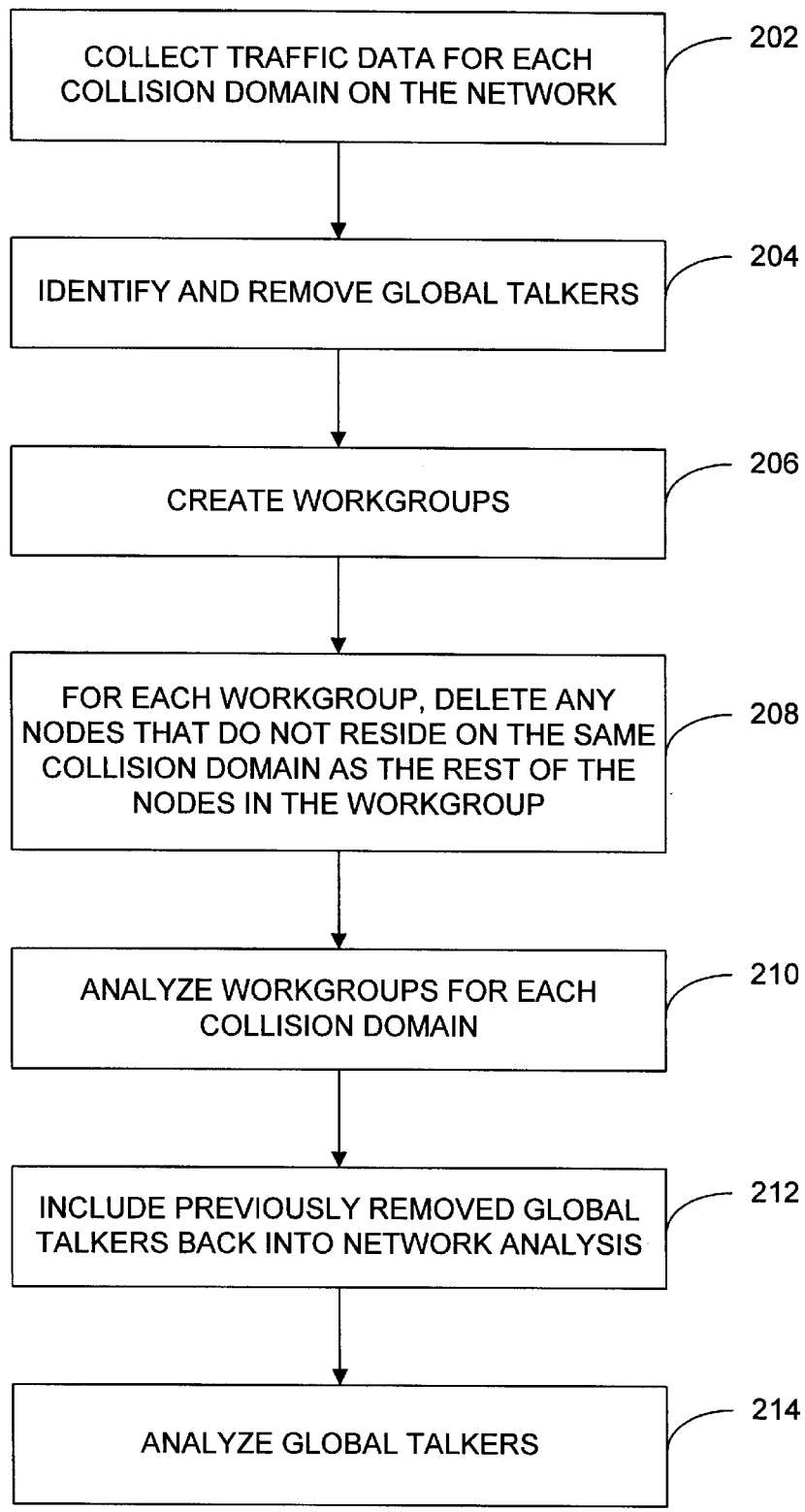
FIG. 1A shows a flowchart outlining the steps of optimizing a network topology according to the present invention.

Referring to FIG. 1A shows a flowchart for optimizing a network topology. The first step in the optimization process is the step of collecting traffic data (202). Traffic data is typically collected for a predetermined period of time. However, the amount of time over which traffic data is collected, the method of traffic data collection, etc. is not critical to the invention and may vary. The type of traffic data collected must include the collision domains on the network, the total amount of traffic per collision domain, the end nodes on each collision domain, and the total amount of traffic between each end node pair that communicates. With traffic data between end nodes, it does not matter which node is sending and which node is receiving. What is critical is the amount of traffic data transferred between the two nodes, regardless of who initiated the data transfer.

Traffic data must be organized such that the amount of traffic passing between any two nodes is accessible. However, devices such as bridges, hubs, routers, and switches must be identifiable. Traffic to and from devices should not be taken into account when making network optimization suggestions. The present invention should check that the nodes involved in the recommendations are not devices. Devices are a means of connecting or extending collision domains; they need not be the focus of network optimizations.

Once traffic data is collected (step 202), the steps implemented by the present invention to determine the optimal network topology are: identify and remove global talkers from the analysis (step 204); create workgroups based on traffic patterns (step 206); for each workgroup, delete any nodes in it that do not reside on the same collision domain as the rest of the nodes in that workgroup (step 208); analyze the workgroups of each collision domain (step 210); insert previously removed global talkers back into the analysis (step 212); and analyze global talkers (step 214).

Figure 2:
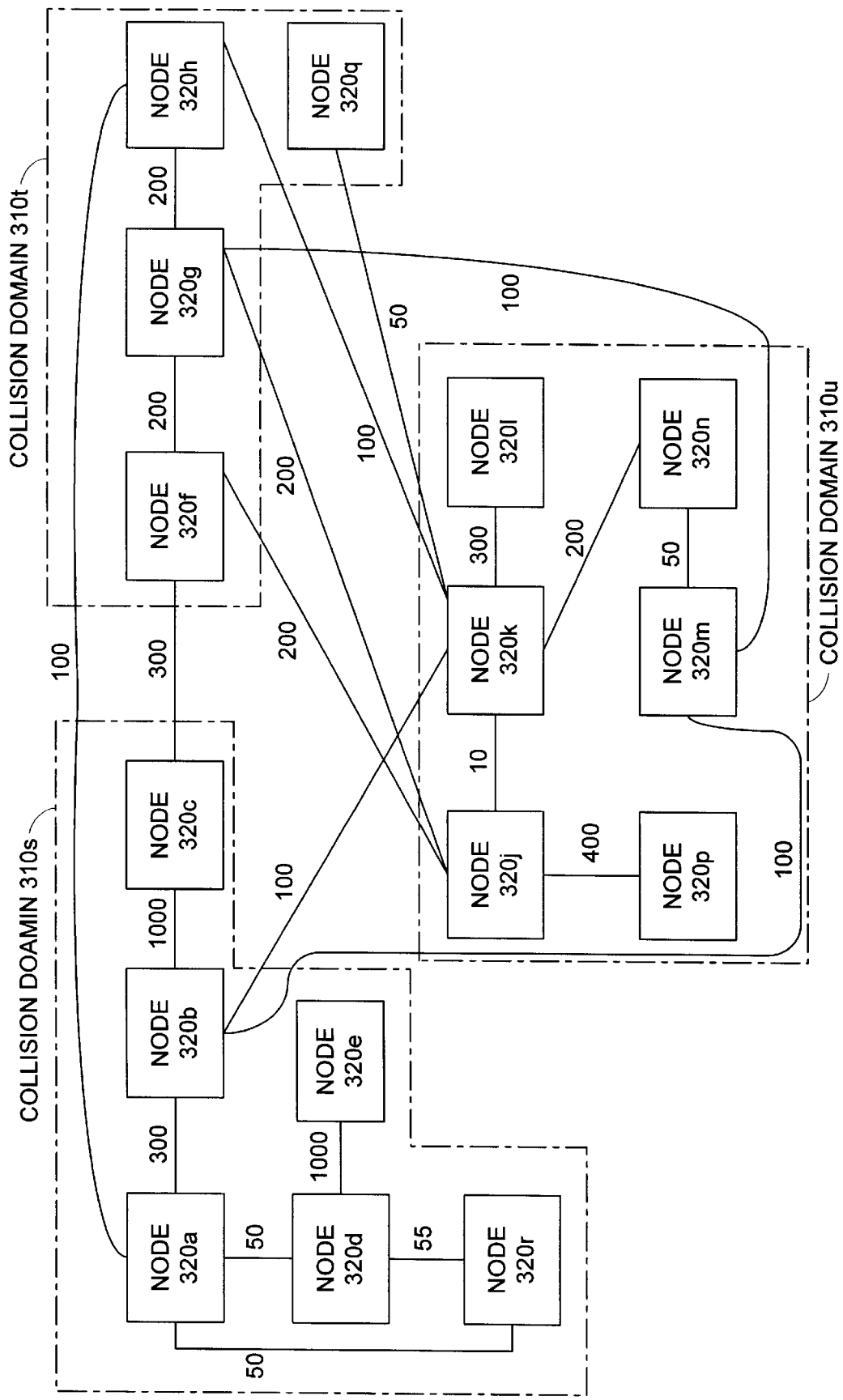
FIG. 2 shows a network topology before optimization.

FIG. 2 shows a network topology before optimization according to the present invention. FIGS. 2–12 show physical representations of the end node movement during the optimization analysis. These movements are merely physical representations of the interim steps of the optimization algorithm and do not necessarily represent movements that should be implemented by the system administrator. For example, in FIG. 4 node 320m is shown physically separated from the other nodes in the network. However, the system administrator should not physically move end nodes in the network before the final recommendations of the optimization tool. Thus, the end nodes should not be physically moved by the system administrator during the optimization analysis. Further, when the final recommendations are made by the optimization tool, the system administrator may choose to implement only a portion of the suggested modifications.

The network shown in FIG. 2 includes three collision domains 310s, 310t, 310u and sixteen end nodes 320a, 320b, 320c, 320d, 320e, 320f, 320g, 320h, 320j, 320k, 320l, 320m, 320n, 320p, 320q, and 320r. End nodes 320a, 320b, 320c, 320d, 320e, and 320r are on collision domain 310s. End nodes 320f, 320g, 320h, and 320q are on collision domain 310t. End nodes 320j, 320k, 320l, 320l, 320m, 320n, and 320p are on collision domain 310u.

The solid lines connecting the end nodes indicate the occurrence of conversations between the connected nodes. These conversations are aggregated over the entire time period being analyzed. The numbers above the solid lines connecting the end nodes indicates the number of bytes passed between the connected end nodes during the time period being analyzed. For example, the solid line connecting nodes 320g and 320h indicates that nodes 320g and 320h talk with each other. Further, the number above the solid connecting line (200 bytes) indicates that 200 bytes of data pass between end nodes 320g and 320h during the analyzed time period. Each collision domain shown requires a different kind of optimization and will be referred to in more detail during the discussion of each optimization.

After traffic data is collected (step 202), global talkers in the network topology are identified and temporarily removed from the network analysis (step 204). Global talkers are nodes whose traffic is dispersed among many different collision domains.

The purpose of identifying the global talkers (which will generally be application servers servicing many diverse nodes) is that global talkers should be placed on a collision domain of its own with a higher speed media; finding a single collision domain on which the global talker can optimally reside is difficult since its traffic is so dispersed. Global talkers usually reside on their own dedicated ports at a faster speed media. Placing global talkers on their own dedicated ports eliminates the congestion at the application server by allowing it to handle a significantly higher number of requests than each client can make. Thus, because the placement of global talker nodes is already determined (placement on its own dedicated port, global talkers are removed from the network analysis before further network optimization analysis occurs. There is one exception to this rule: if there is a node which has more than a predefined threshold (typically 70%) of its traffic directed to or from the global talker, then the global talker will be redefined as a normal node because it has a node that is inextricably tied to it. In the case of a global talker having an inextricable node, it may not be wise to place the global talker on a dedicated port because the node tied to it is so heavily dependent on it and would have to send nearly all of its traffic across a bridge, switch, or router.

In the network topology shown in FIG. 2, the nodes which have the potential for classification as a global talker are the nodes 320k, 320h and 320m, because none of them have a clear collision domain to which most of its traffic flows. Nodes 320k, 320h and 320m talk with nodes on all three collision domains. Of these nodes, node 320h talks with nodes on collision domain 310s for a total of 100 bytes. In addition, node 320h talks with nodes on collision domain 310t a total of 200 bytes and further talks with nodes on collision domain 310u a total of 100 bytes. Furthermore, all nodes talking with node 320h talk with other nodes at least as much. Therefore, there is no single node that is totally dependent on node 320h and so there is no good collision domain on which node 320h could reside without causing a lot of traffic between collision domains. Node 320h is therefore designated a global talker.

The same reasoning causes node 320m to be designated a global talker as well. Node 320m talks with nodes dispersed throughout the collision domains, but none of the nodes it talks with are inextricably dependent on node 320m. Node 320k also talks with nodes on all three collision domains, but over 70% of node 320l's traffic (in this case all of it) is directed at node 320k. Therefore, node 320k is not designated a global talker because node 320l has no point of reference without considering node 320k.

Figure 3:
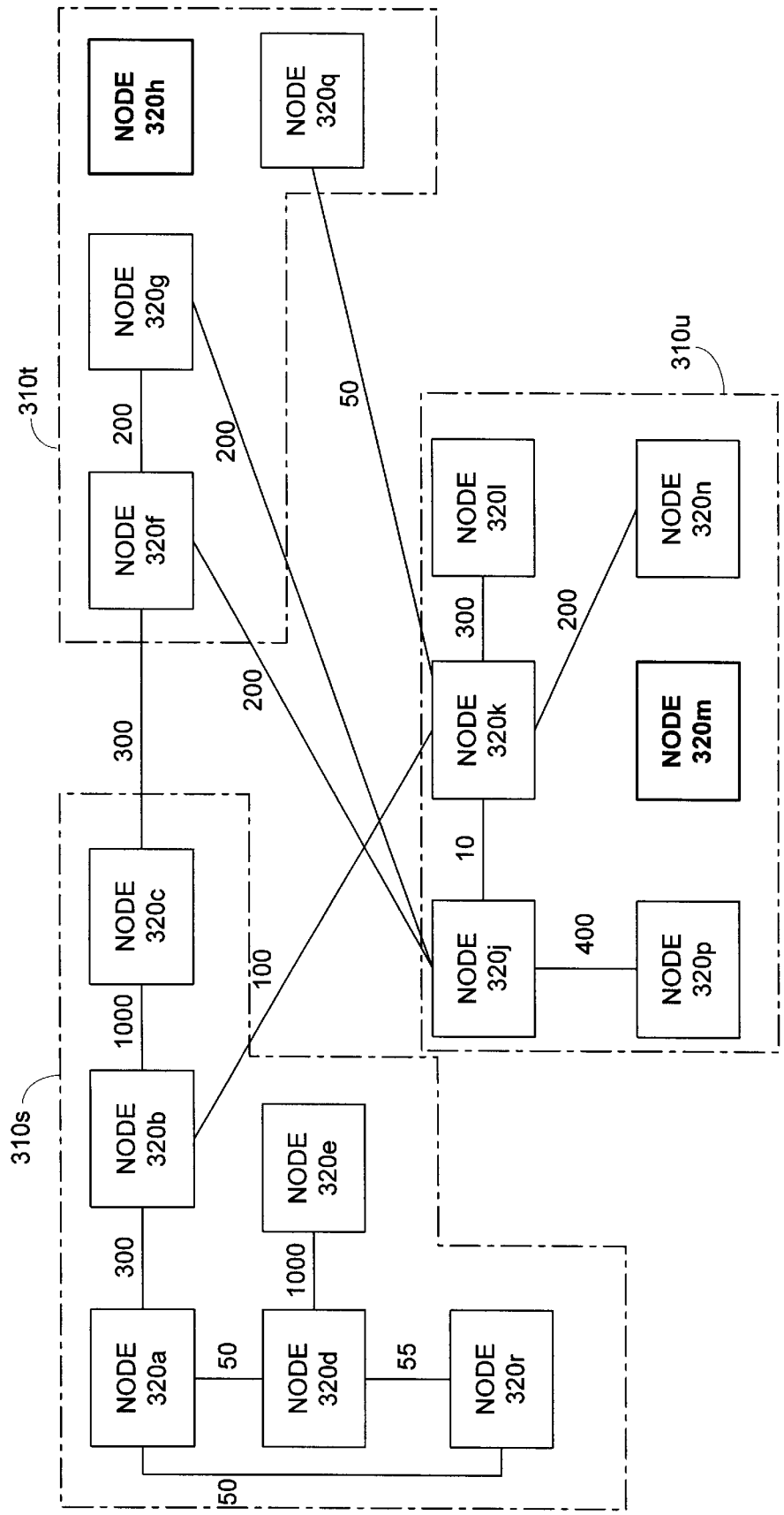
FIG. 3 shows the network topology shown in FIG. 2 after removal of global talkers from the analysis.

After all global talkers have been designated, they are temporarily removed from this analysis. Therefore, for the network topology shown in FIG. 2, nodes 320h and 320m are temporarily removed. By removal, we mean are not to be considered connected for the purposes of this analysis. Nodes 320h and 320m will be considered later after all other nodes have been optimally placed. Node 320h's traffic with nodes 320a, 320g and 320k is also removed, as is node 320m's traffic with nodes 320b, 320n and 320g. The new network layout after the step of removal of the global talkers is shown in FIG. 3. By removal, we mean are not connected to the network. In FIG. 3, the global talkers are shown and are highlighted, but are not connected to the network.

Referring to FIG. 1A, after removal of the global talkers (step 204), the next step in the optimization process is the creation of workgroups (step 206). Workgroups are logical groupings of nodes that talk to one another. Further, a workgroup is tied to a particular collision domain. To group the nodes into workgroups, dependencies need to be explicitly drawn.

Figure 1B:
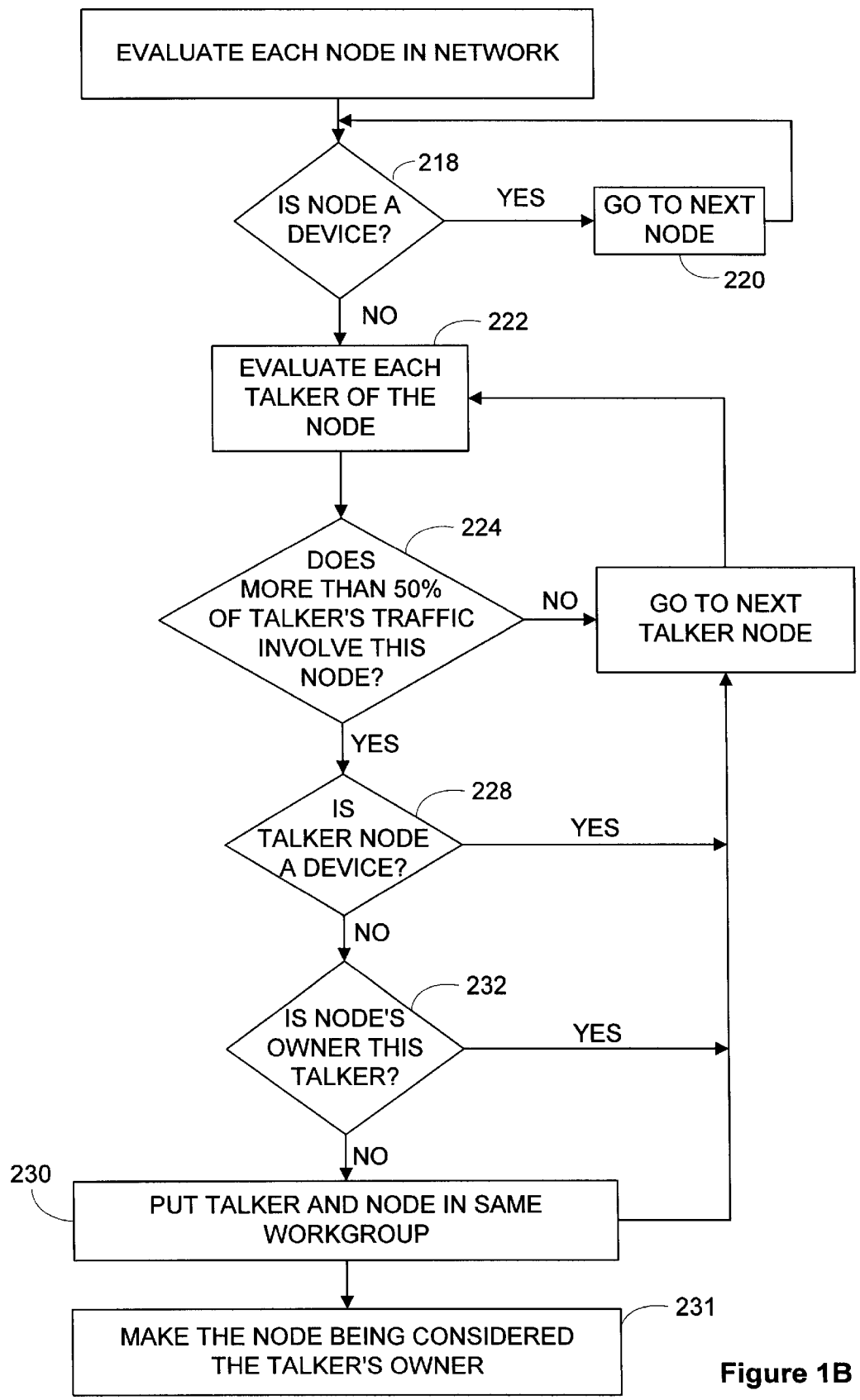
FIG. 1B shows a detailed flowchart of the steps involved in creating workgroups.

FIG. 1B shows a detailed flowchart of the steps involved in creating workgroups. Each node in the network is considered independently and first a check is performed to see if the node currently being considered is a device (step 218). Devices are not considered in this algorithm because we are optimizing each collision domain independently. So we are optimizing around the existing devices, rather than including them as part of the optimizations. Thus, if the node under consideration is a device (step 218), then the optimization tool merely goes to the next node to be considered (step 220).

Assuming the node under consideration is not a device and referring to the network shown in FIG. 3, proceed to step 222 and evaluate each node that the node under consideration talks with (hereinafter, a talker). For example, if in FIG. 3 node 320b is the node currently being considered, then nodes 320a, 320c and 320k are talkers. A determination is then made to see if the talker node is an "owner" of the node being considered. Thus in the aforementioned example, talker nodes 320a, 320c and 320k would be tested to determine whether node 320b is their owner. A node is considered to have an owner if more than half its total traffic is directed to or from that owner.

For the network shown in FIG. 3, assume that no nodes are devices and that node 320b is the node being considered and node 320a is a talker. Node 320a talks with node 320b more than half of its total traffic (step 224). Therefore, node 320b is node 320a's owner.

Once it is determined that the node under consideration is the talker's owner (step 224) ensure that the talker is not a device (step 228). For reasons mentioned previously, device traffic should not be considered in network optimizations. Next, ensure that the talker is not already classified as the owner of the node under consideration. This avoids circular dependencies caused by two nodes who talk to each other more than to any other nodes on the network (step 232). In our example, assume that node 320a is not a device. Also, node 320a could not be the owner of node 320b since node 320b talks to the other nodes more than to node 320a. Therefore, there is no circular dependency with owners.

Figure 4:
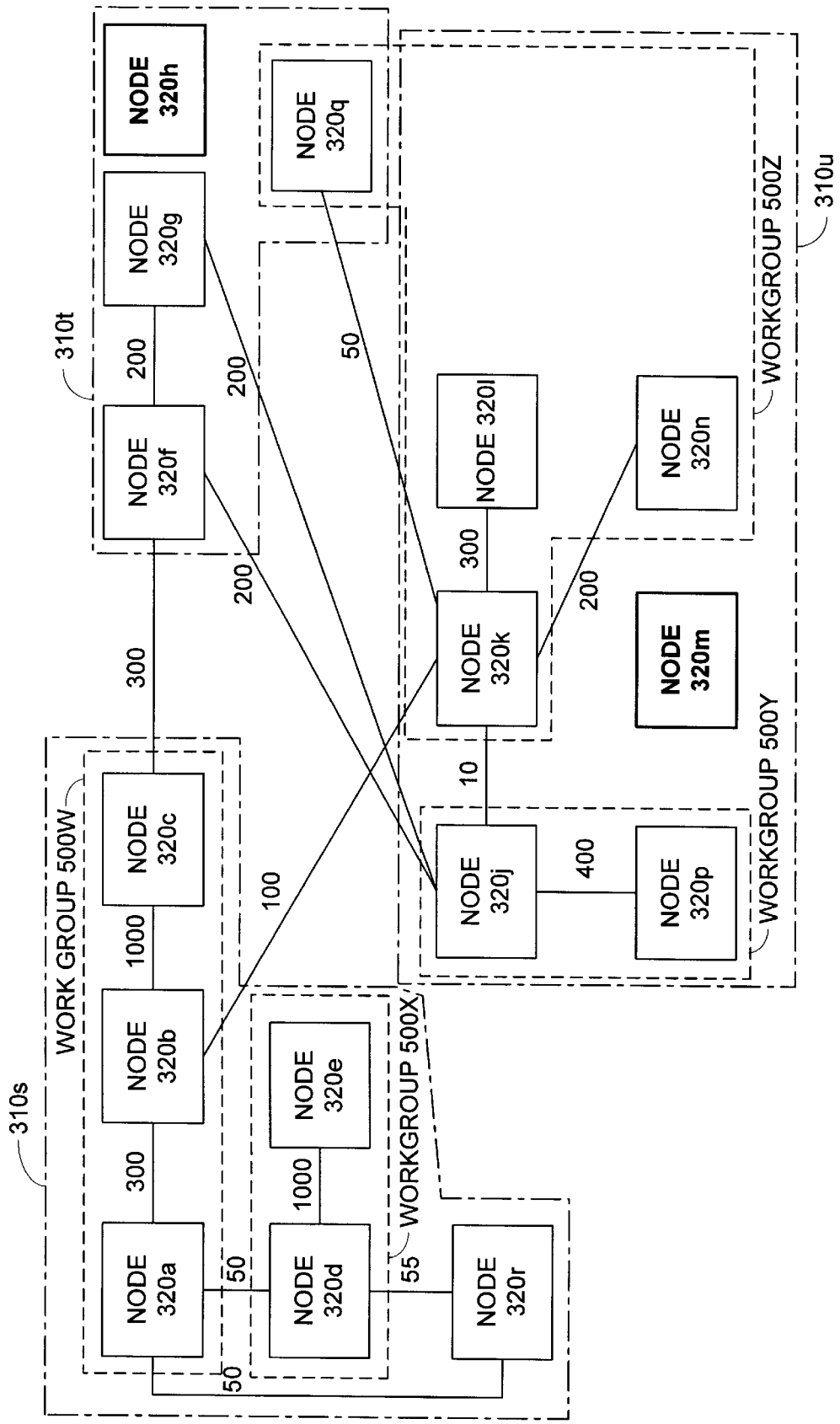
FIG. 4 shows the network topology shown in FIG. 3 after positioning of the nodes which have no owners in the most appropriate collision domain.

If it is still possible to assign the node under consideration to be the owner of the talker, then the talker and the node under consideration are put in the same workgroup (step 230) and the node under consideration is assigned as the talker's owner (step 231). In our example, it is still possible to make this assignment since there was no circular dependency. Therefore nodes 320b and 320a are placed in the same workgroup and node 320b is assigned as node 320a's owner. The following analysis describes the formation of workgroups for the network shown in FIG. 3. FIG. 4 shows the resulting network topology after all nodes and their talkers have been considered.

If node 320c is considered before node 320b, then node 320b would be a talker of node 320c. Node 320c would be assigned as node 320b's owner because more than half of node 320b's traffic involves node 320c. Then when node 320b is being considered, it could be assigned an owner of node 320c. However, since that would create the circular dependency of node 320c being node 320b's owner and vice versa, the later assignment is skipped. All of node 320e's traffic is directed at node 320d; therefore, node 320d is 320e's owner. Similar to the prior analysis of node 320c, node 320d could be classified as 320e's owner, but will not be because of the circular dependency that it would create. Node 320l only talks with node 320k so node 320k is its owner. The same is true for node 320n. Node 320k is node 320n's owner. Also, all of node 320q's traffic goes to node 320k, making node 320k node 320q's owner. Finally, node 320*p* talks only to node 320*j* making node 320*j* node 320*p*'s owner. That leaves nodes 320*c*, 320*d*, 320*r*, 320*f*, 320*g*, 320*j*, and 320*k* without owners due to their relatively even distribution of traffic to other nodes or the circular dependency caused by their assignment of owners.

When each owner is determined in the previous paragraph, each of its talkers is also considered and workgroups are created at the same time the owners are being defined. Because node 320*c* is node 320*b*'s owner and node 320*b* is node 320*a*'s owner, all three nodes (320*a*, 320*b*, 320*c*) are dependent on one another and are all placed in a single workgroup tied to collision domain 310*s*. Likewise, nodes 320*d* and 320*e* are dependent on one another because node 320*d* is node 320*e*'s owner. They are placed in a workgroup together and tied to collision domain 310*s* as well. Nodes 320*k*, 320*l*, 320*n* and 320*q* are also placed in a single workgroup because node 320*k* is node 320*l*'s, node 320*n*'s and node 320*q*'s owner. Node 320*k*'s workgroup is tied to collision domain 310*u* because node 320*k* is the owner and because node 320*k* is on collision domain 310*u*. Finally, nodes 320*j* and 320*p* are placed in the same workgroup tied to collision domain 310*u* because node 320*j* is node 320*p*'s owner. Nodes 320*r*, 320*f* and 320*g* are not placed in any workgroup because they have no discernable dependencies on any other nodes.

Referring back to FIG. 1A, the creation of workgroups (step 206) has now been completed. The next step involves analyzing each workgroup and removing any nodes from their workgroup that don't reside on the workgroup's collision domain (step 208). This is a safeguard against users who choose to optimize each collision domain in their network without ensuring that nodes are placed optimally between collision domains. Normally, nodes that are owners of other nodes will already reside on the same collision domain and therefore each workgroup will consist of nodes only on a single collision domain. This invention is concerned with optimizing each collision domain independently. Another invention ensures that nodes are optimally positioned throughout the collision domains. Therefore, there could be workgroups consisting of nodes from different collision domains.

The steps for the paring down of workgroups to their confining collision domains are outlined as follows. For each workgroup existing in the network, any nodes that are not currently residing on the same collision domain as the workgroup are removed from the workgroup (step 208).

Referring to FIG. 4, workgroup 500*z* is tied to collision domain 310*u* but node 320*q* is not on collision domain 310*u*. The present algorithm is only looking at ways to optimize a single collision domain at a time, so even though node 320*q* belongs with node 320*k*, it cannot be considered during the determination of optimizing collision domain 310*u*. Therefore, node 320*q* is removed from workgroup 500*z*.

Figure 1C:
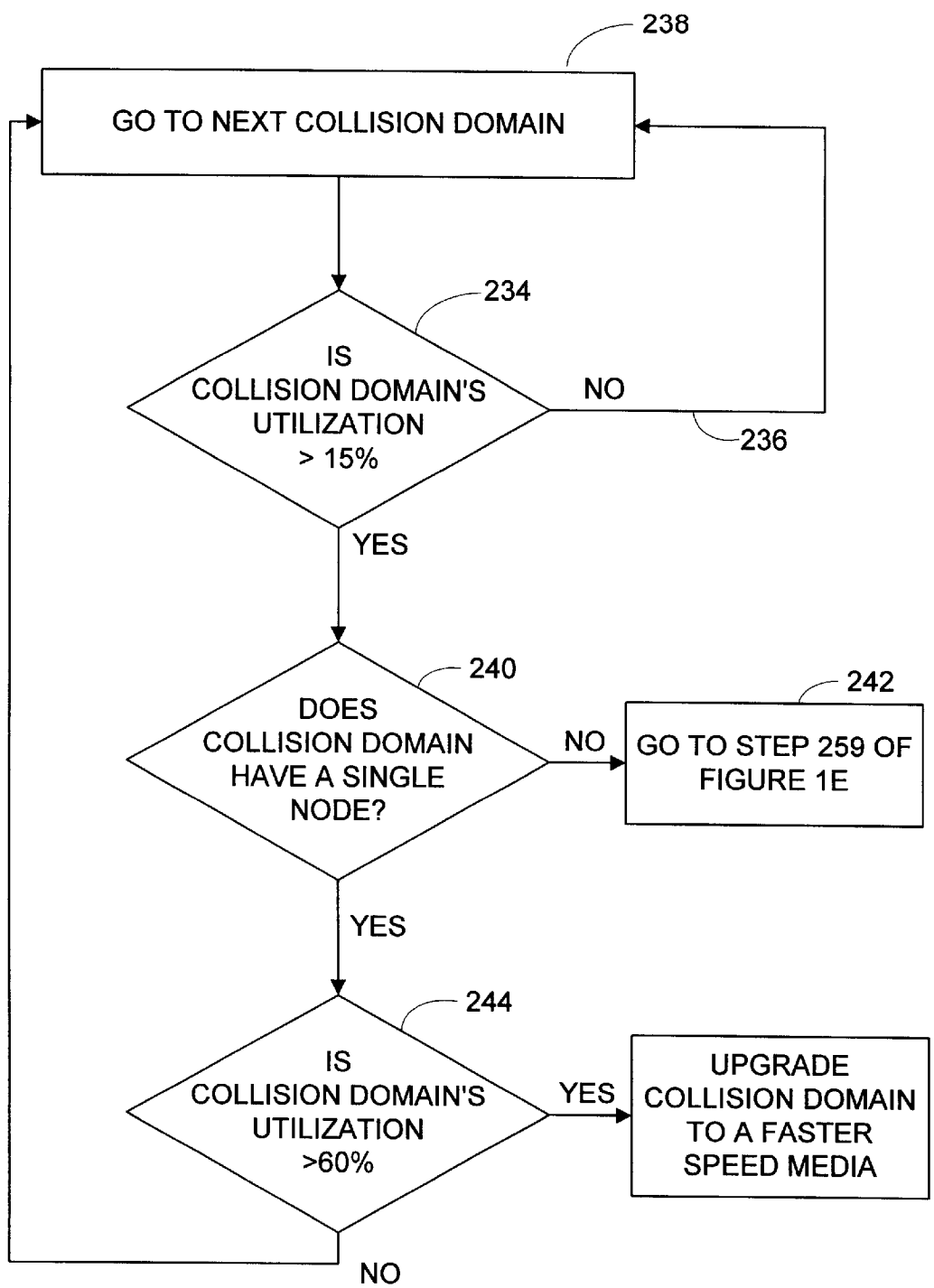
FIG. 1C shows a flowchart that details the step of analyzing workgroups for each collision domain (step 210 of FIG. 1A.)

Referring to FIG. 1A again, step 208 is now complete. FIG. 1C shows a flowchart for FIG. 1A's step 210, Analyze workgroups for each collision domain. If a collision domain is over utilized then the collision domain is tested to determine whether it can be divided into the workgroups computed for the collision domain. This determination of whether the collision domain will be split into workgroups is based on whether the workgroups are well balanced, whether traffic between nodes on different workgroups is minimal, and whether the workgroups themselves are not being over utilized. If these conditions hold true, then the collision domain can be split into its workgroups, causing the workgroups to become new collision domains themselves.

Referring to FIG. 1C, the first step in determining whether the collision domain is over utilized is checking whether the collision domain's utilization is greater than a predetermined threshold value (step 234). In the flowchart shown in FIG. 1C, the predetermined threshold value is 15%, however, this threshold value can be adjusted by the user. The predetermined threshold value is an average utilization over the time period being analyzed and therefore is a lower threshold than expected for reactive management of the network. For most networks, the predetermined threshold can be 15%.

If the collision domain utilization is less than 15% (236), then the algorithm goes to the next collision domain (238) because there is no performance problem on that collision domain requiring optimizations. If the collision domain's utilization is greater than 15%, then the collision domain is over utilized and must be optimized. The algorithm next checks to determine whether the collision domain has a single node. If the collision domain has more than a single node, the algorithm will find the workgroups for this collision domain (242) and try to split the collision domain into these workgroups. These steps are shown in FIG. 1E. If the collision domain has only a single node, then the collision domain is considered to be in a desktop switching environment meaning that the user wanted an isolated port for this node. Since it is the only node using bandwidth on this collision domain, its over utilization threshold can be much higher. Therefore, a check is made to determine whether the collision domain's utilization is over a predetermined threshold of 60%, compared to the threshold of 15% in step 234. If the collision domain's utilization is greater than 60% (step 244), then the resultant suggestion of the optimization algorithm is to upgrade the collision domain to a faster speed media.

Refer to FIG. 1E for determining whether the collision domain should be split. The first step involves trying to divide the collision domain into multiple workgroups. Furthermore, because the result of dividing a collision domain into multiple collision domains could be a costly venture for the customer, this algorithm ensures that only the minimum number of new collision domains are created to accomplish the task of decreasing utilization on the offending collision domain.

The first step is to create workgroups for each node on the collision domain that is not already in a workgroup (step 259). This includes the following. For each collision domain in the network, each node is traversed. If the node does not reside in any workgroup, either because it was never placed in a workgroup because it doesn't have a clear dependency with another node, or because it was removed from a workgroup belonging to another collision domain, a workgroup should be created for the node with that node as the sole member of the workgroup. This workgroup should be assigned to that node's collision domain.

Figure 5:
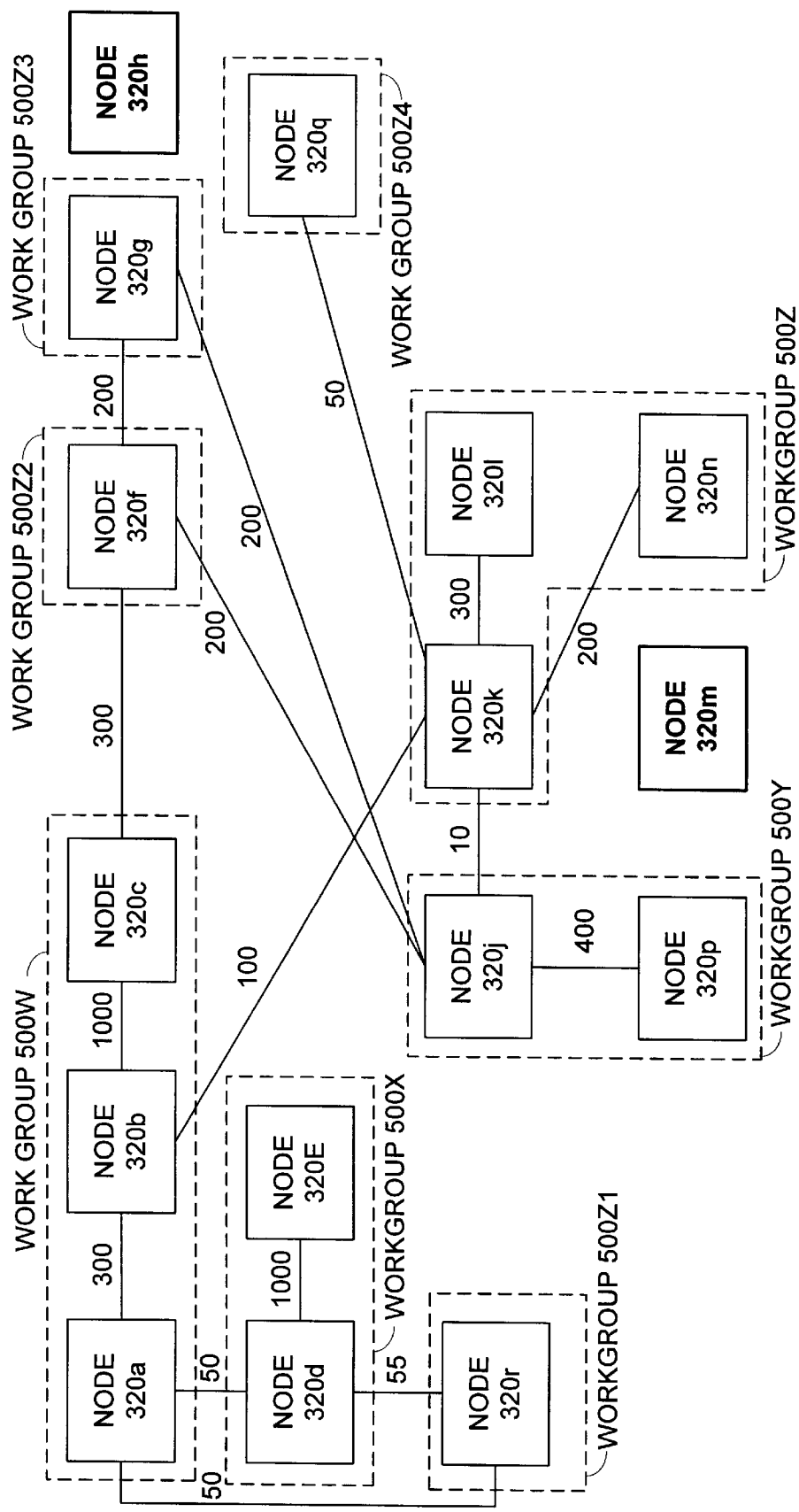
FIG. 5 shows the network topology shown in FIG. 4 after the addition of the global talker into the analysis.

In our example, all nodes on the network belong to a workgroup with the exception of nodes 320*r*, 320*f*, and 320*g* and the removed node 320*q*. Therefore, four new workgroups are created. One workgroup is tied to collision domain 310*s*. The other three workgroups are tied to collision domain 310*t*. Workgroup 500*z*1 belonging to collision domain 310*s* will have node 320*r* as its sole member. Workgroup 500*z*2 will house node 320*f*, workgroup 500*z*3 will house node 320*g* and workgroup 500*z*4 will house node 320*q*. FIG. 5 shows the analyzed network after creation of single node workgroups.

Because planning thresholds are being used which are lower than reactive thresholds, the division of a collision domain into workgroups should also build in enough room for some amount of growth before further divisions are necessary. Therefore, find the workgroups for this collision domain (step 260) and if the number of workgroups on a particular collision domain is greater than two (step 270), then try to combine the workgroups until only two remain (steps 262, 264, 266, and 268). This is done by identifying the workgroup with the least number of nodes in it and combining it with one of the other workgroups in the collision domain that most of its traffic flows to.

Figure 6:
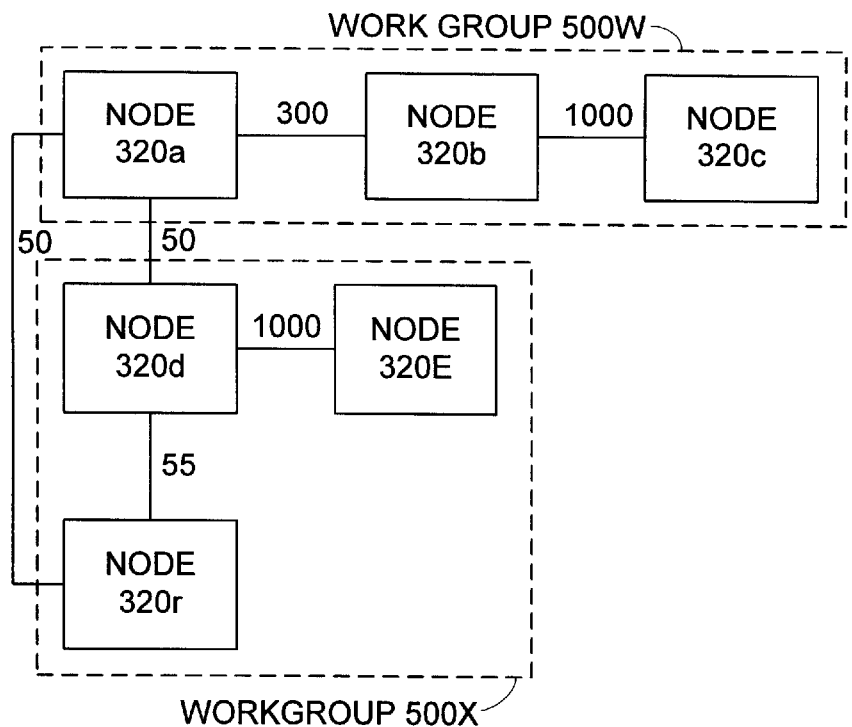
FIG. 6 shows the resultant workgroups of collision domain 310s.

Referring to FIG. 5, collision domain 310s includes workgroups 500w, 500x and 500z1, so node 310s has more than two workgroups (step 270). Workgroup 500z1 has the smallest number of nodes in it (step 262) so we need to find another workgroup in collision domain 310s that most of the workgroup 500z's traffic flows to, in order to combine workgroups (step 264). In the present example, for collision domain 310s that would be workgroup 500x. Workgroups 500z1 and 500x are combined into workgroup 500x (step 266) and workgroup 500z1 is deleted (step 268). There are no longer more than two workgroups for this collision domain so a unique subnumber is set for workgroups 500w and 500x (step 272). The resultant workgroups are shown in FIG. 6.

Figure 1D:
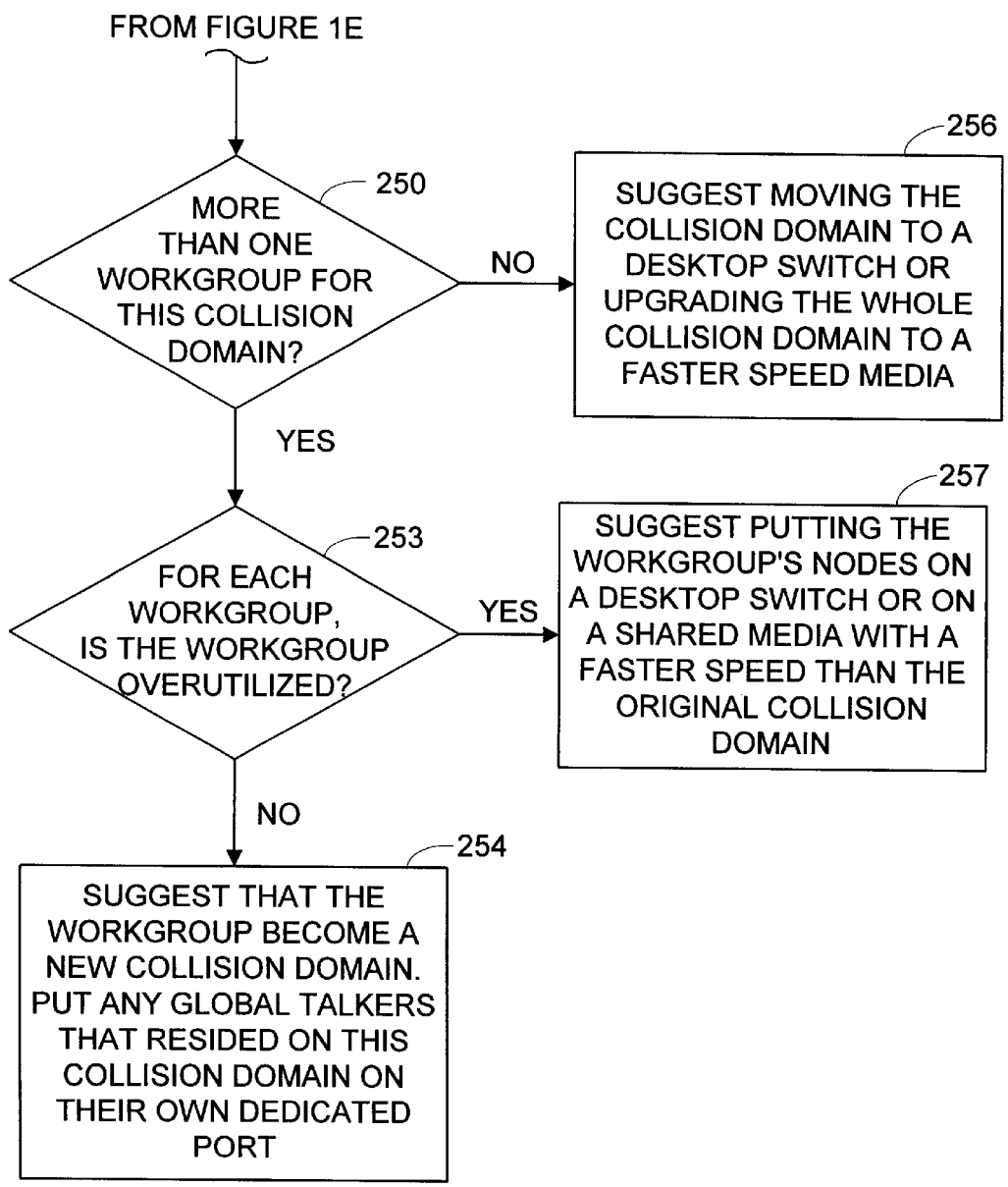
FIGS. 1D and 1E show steps for determining whether the collision domain should be split.
Figure 1E:
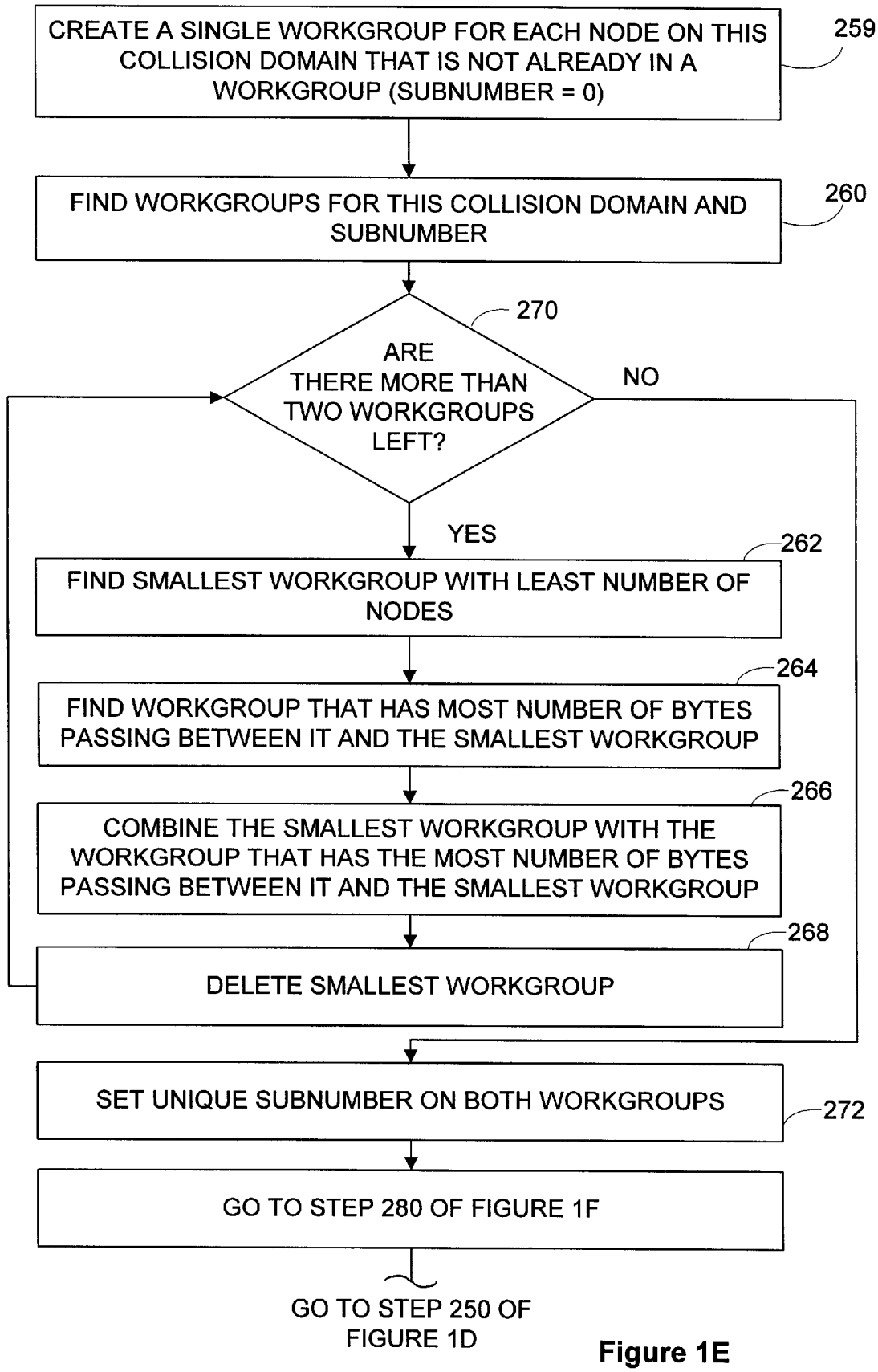
Figure 1F:
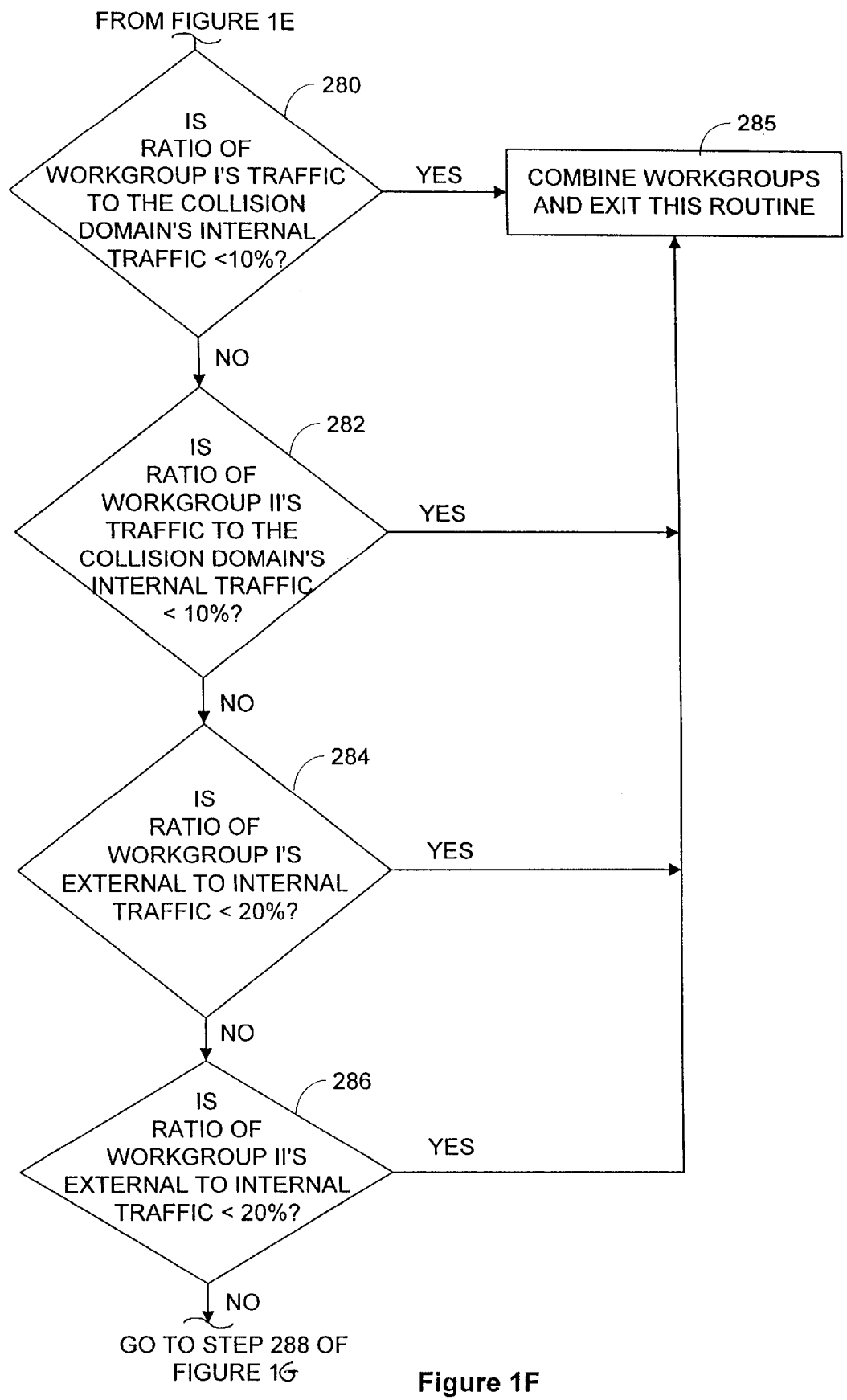
FIG. 1F shows a flowchart outlining the step of determining whether or not a collision domain can be divided into its workgroups.

Referring to FIG. 1F, the next step in the process of determining whether or not a collision domain can be divided into its workgroups is to compare the amount of traffic on each workgroup to the amount of internal traffic on the collision domain (steps 280, 282). The reason for this determination is that if we decide to split this collision domain, we want the collision domain's traffic to be reasonably dispersed among the newly created collision domains. Otherwise, one of the new collision domains will get overloaded in a fairly short period of time. If the new collision domains are quickly overloaded, the benefits of making the split are reduced since the user would have to continually readjust the network.

Steps 280 and 282 compare the ratio of the workgroup's traffic to the internal traffic on the collision domain and are used to determine if the workgroups are well balanced. Only the internal collision domain traffic is considered since traffic passing external to the collision domain (as between nodes 320c and 320d) is typically considered in another algorithm, for example in the algorithm described in the application entitled "Method and Apparatus for Network Topology Optimization by Node Movement," filed on Mar. 31, 1998. The default threshold for steps 280 and 282 is that each workgroup must represent at least 10% of the original collision domain's internal traffic. In the example shown in FIG. 6, workgroup 500w sees 1,400 bytes over the time period being analyzed. Since the original collision domain sees 2,455 bytes internally, the amount of traffic of workgroup 500w is over 10% of the total collision domain. Similarly, workgroup 500x with its 1,155 bytes of internal traffic, also meets that requirement.

If the two workgroups (workgroups I and II) are skewed enough (in this case greater than or equal to 10%), then the two workgroups being considered are recombined (step 285).

If each workgroup consists of a reasonable amount of the original collision domain's traffic, the amount of traffic that passes between nodes on different workgroups is then computed (steps 286 and 284). The amount of traffic that passes between nodes on different workgroups represents the amount of traffic that would have to cross a bridge, router, or switch if a recommendation to split this collision domain were made. The threshold used here is that less than 20% of the workgroup's total traffic should pass external to the workgroup. For workgroup 500w, 100 bytes out of its 1,400 total bytes goes external to the workgroup, much less that the 20% limit. Similarly, only 100 out of 1,150 bytes goes external to workgroup 500x.

If the amount of traffic traveling external to the workgroup is significantly greater (in FIG. 1F, greater than 20%) than the amount of traffic internal to the workgroup, then the recommendation made will be to recombine the two workgroups (step 285). In this case, creating two different workgroups would just result in a different bottleneck problem, that of too much traffic passing over a bridge, switch or router. As discussed later in this specification, this is a recursive procedure and therefore the recombination either means that the collision domain cannot be split at all, or we have reached the end of the algorithm's ability to effectively split the collision domain any further.

Figure 1G:
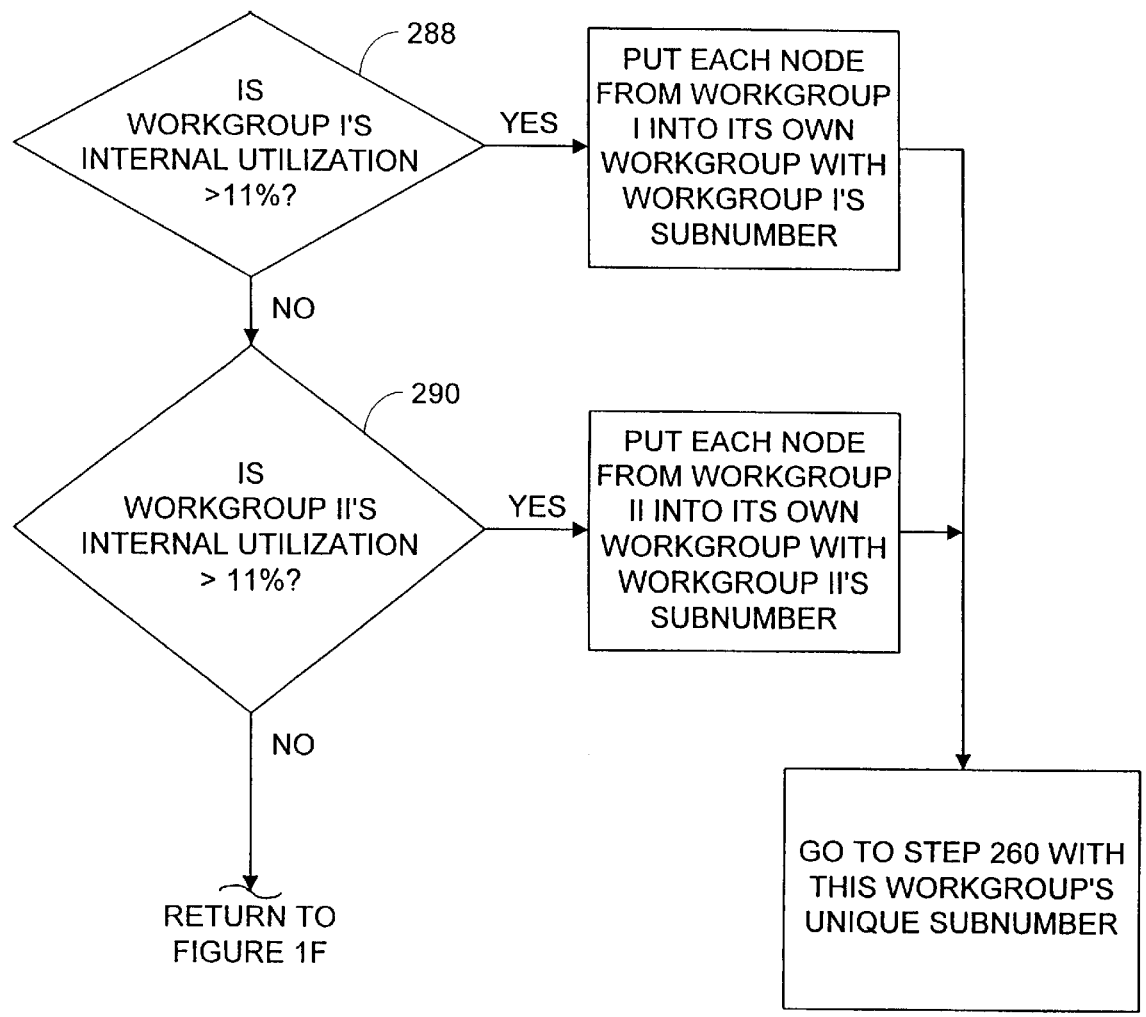
FIG. 1G shows a flowchart outlining the steps of determining whether the workgroup is over utilized.

Steps 280, 282, 284, and 286 are used to determine whether the traffic flow internal and external to the workgroup represents a good division of traffic. After this determination is made, the optimization algorithm determines whether each workgroup needs to be split further. This determination follows similar logic as for the original collision domain. Referring to steps 288 and 290 in FIG. 1G, If the workgroup exceeds the default threshold of 11%, then the workgroup is still over utilized (or will be soon) and should be split further if possible. Otherwise, the user may need to make yet another topology change in the near future when the new collision domain created from this workgroup becomes a bottleneck.

Therefore, an attempt should be made to split each of these workgroups into two other workgroups, until each workgroup in the final list of workgroups for this collision domain is below the default threshold value. The result is two or more workgroups belonging to the same collision domain each of which is below the default threshold. In our example, let's assume that both workgroups 500w and 500x are now below the default threshold. Therefore, the workgroups 500w and 500x need not be further subdivided.

Figure 7:
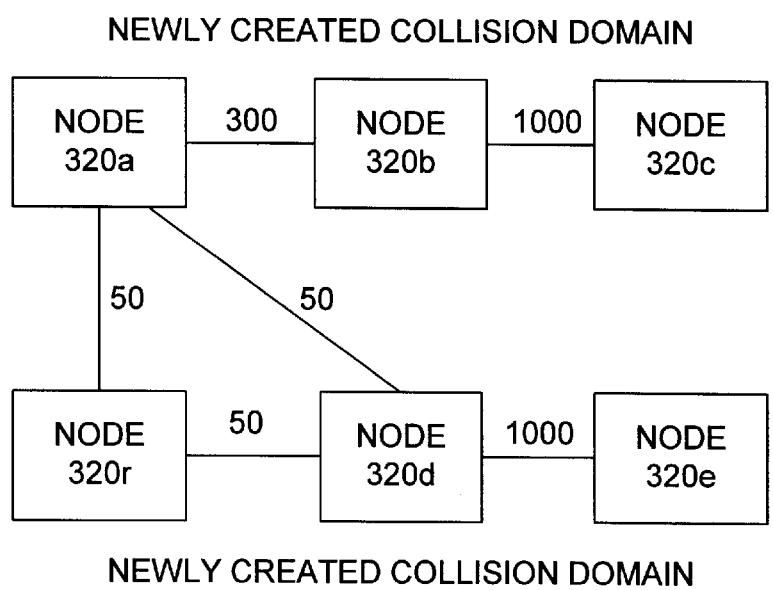
FIG. 7 shows the final recommendation to split collision domain 310s into two new shared collision domains.

Referring to FIG. 1D, step 250 determines if there is more than one workgroup into which this collision domain can be split. In our example there is. Therefore step 253 traverses each workgroup to determine if it is still over utilized and cannot be divided further. In our example, neither of the workgroups are over utilized so step 254 suggests a new collision domain to be created for each workgroup. Also, if any global talkers that were temporarily removed in step 204 originally resided on the collision domain being split, a special workgroup is created for each of them with each global talker as its workgroup's sole member (step 254). The result will be a suggestion to split the collision domain into the number of workgroups plus the number of global talkers on this collision domain, with each global talker ending up on its own dedicated port. In our example, there were no global talkers removed from collision domain 310s so the final recommendation is to split collision domain 310s into two new shared collision domains, one holding nodes 320a, 320b, and 320c and the other holding nodes 320d, 320f and 320r as shown in FIG. 7.

Referring to FIG. 1D, if it has been determined that a collision domain cannot be split into multiple workgroups (step 250), either because only one workgroup has been identified on it, or because the two workgroups that were identified either didn't distribute the original traffic evenly or caused too much traffic between them, the next step is to consider alternatives to splitting a collision domain. There are two such alternatives: upgrade the collision domain's speed or move the whole collision domain to a desktop switch (step 256).

The advantage of a desktop switch is that each end node has its own dedicated port and therefore its own dedicated media speed link for its own use. There is no contention on each node's link except for traffic specifically destined for that node. However, in desktop switching environments, the switch itself can become a bottleneck unless all the nodes attached to the switch talk a significant amount to only a few other nodes which can be placed on higher speed links. In that case, the nodes involved in most of the conversations would be able to handle much more traffic and alleviate the contention problem on the switch. This is determined as follows: examine each node's contribution of traffic to the entire collision domain, if any node's traffic comprises more than half the default threshold of 15%, that node belongs on a high-speed port, otherwise it belongs on a low speed port.

Upgrading the entire collision domain to a faster speed media also has its advantages, besides the obvious one of not having to change the topological layout and relationships between the nodes on that collision domain. First of all, it eliminates the problem that exists with desktop switching if all nodes were to be on the same speed dedicated ports. Secondly, it provides a better opportunity to attach traffic collection devices to a single collision domain instead of to each port of a switch.

However, upgrading may also increase cost as the end nodes' NIC (Network Interface Cards) and networking devices will most likely have to be replaced, not to mention the possibility of having to upgrade the cabling on that collision domain. Because this is a personal decision and one based on the financial status and future growth expectations of the customer, these two alternatives are presented interchangeably. However, this algorithm does indicate which alternative appears to be the better solution based on its analysis of traffic patterns, following these three rules: if the collision domain contains nodes that can be placed on higher speed ports, or if the combined utilization on a faster speed shared media is too great, or if the current shared media is already at the maximum known speed, desktop switching is recommended first. Otherwise, upgrading the speed of the shared media is recommended first. For any collision domain that has one of these recommendations made for it, include any global talkers originally residing on this collision domain into the recommendation. They are treated like any other node.

Figure 8:
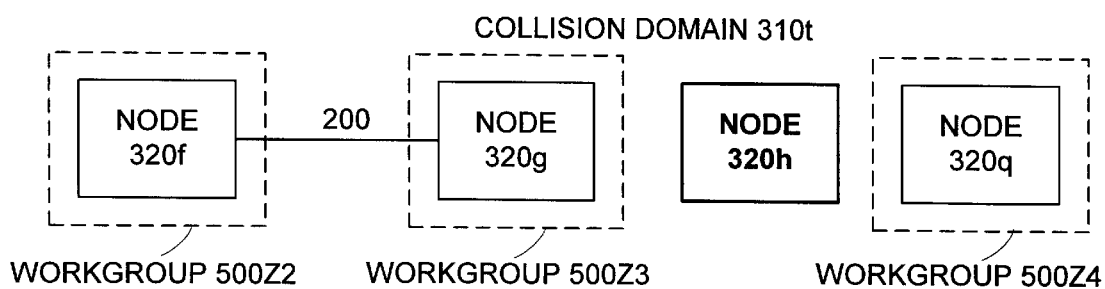
FIG. 8 shows the workgroups which make up collision domain 310t.
Figure 9:
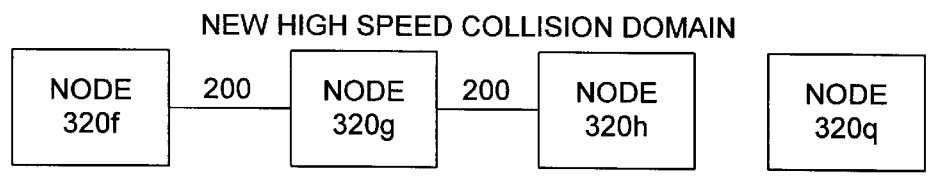
FIG. 9 shows the final recommendation to upgrade collision domain 310t.

Consider collision domain 310*t* in FIG. 8 for an example. The first thing we would try to do on collision domain 310*t* is to split the collision domain into two workgroups. We would start by finding the workgroup with the smallest number of members. Since they all have one member, choose workgroup 500*z*2 at random. Next, find the workgroup that 500*z*2's nodes talk with the most. Workgroup 500*z*2 's nodes only talk with node 320*g* in workgroup 500*z*3 so 500*z*2 and 500*z*3 are combined into one workgroup. However, because combined workgroup 500*z*2/500*z*3 consists of 100% of the original collision domain's internal traffic, and workgroup 500*z*4 consists of 0%, these two workgroups are not viable workgroups into which to split this collision domain and they are recombined as per step 285 of FIG. 1F.

FIG. 1F then returns to FIG. 1E which proceeds to FIG. 1D. Step 250 sees that we only have one workgroup since they were all combined and we proceed to step 256. There are two possibilities here: either suggest a desktop switching environment or upgrade to a faster speed media. Assume for the moment that we will recommend desktop switching for this collision domain. Include node 320*h* back into the list of nodes residing on collision domain 310*t* and examine each node's traffic levels individually. Node 320*f* contributes a total of 200 bytes to collision domain 310*t*. The same is true for node 320*g* and node 320*h* (it talks with node 320*g* 200 bytes). However, node 320*q* contributes no traffic internally to collision domain 310*t*. Let's assume that 200 bytes fell below half the 15% threshold. Therefore, there do not exist any nodes that could be placed on high speed ports. Further, assume that the current shared media is not already at the maximum known speeds and that collective utilization of the nodes on this collision domain does not exceed 15% of an increased media speed. Then we would recommend that collision domain 310*t* remain shared, but that its media speed is increased. The resulting suggestion would look like the collision domain shown in FIG. 9.

In the determination of whether a collision domain should be split, there could arrive a point at which a collision domain has been split into two workgroups, but one workgroup still exceeds the threshold recommended for a new collision domain. In that case, the algorithm will try to provide a hybrid solution between splitting the collision domain, upgrading the media and moving the collision domain to a desktop switch.

If a collision domain is determined to be over utilized and two or more workgroups can be found on that collision domain, but at least one workgroup is still over utilized and cannot be split any further, analyze the traffic on the over utilized workgroup. Since the workgroup cannot be further subdivided, it must instead either be placed on a desktop switch or upgraded to a faster speed in order to alleviate the over utilization problem. Consider collision domain 310*u* in the example network.

Figure 10:
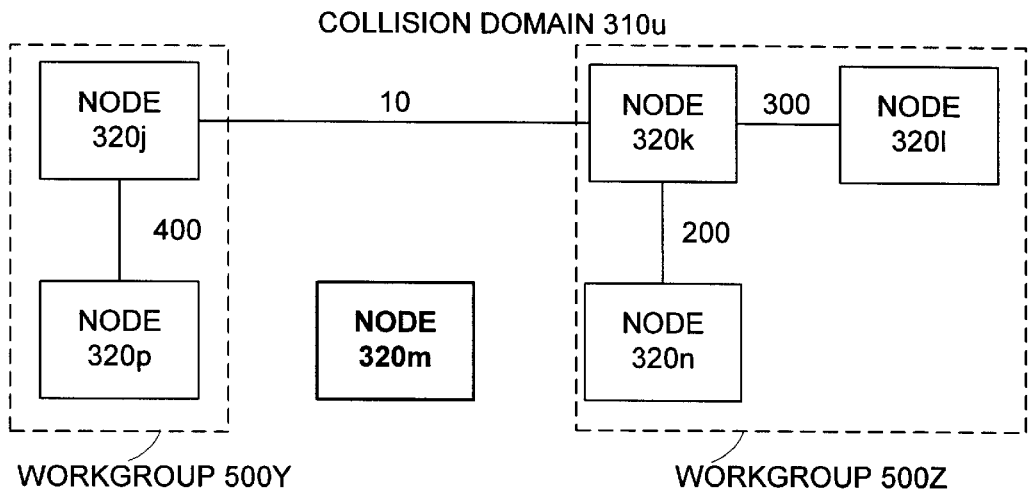
FIG. 10 shows the workgroups which make up collision domain 310u.
Figure 11:
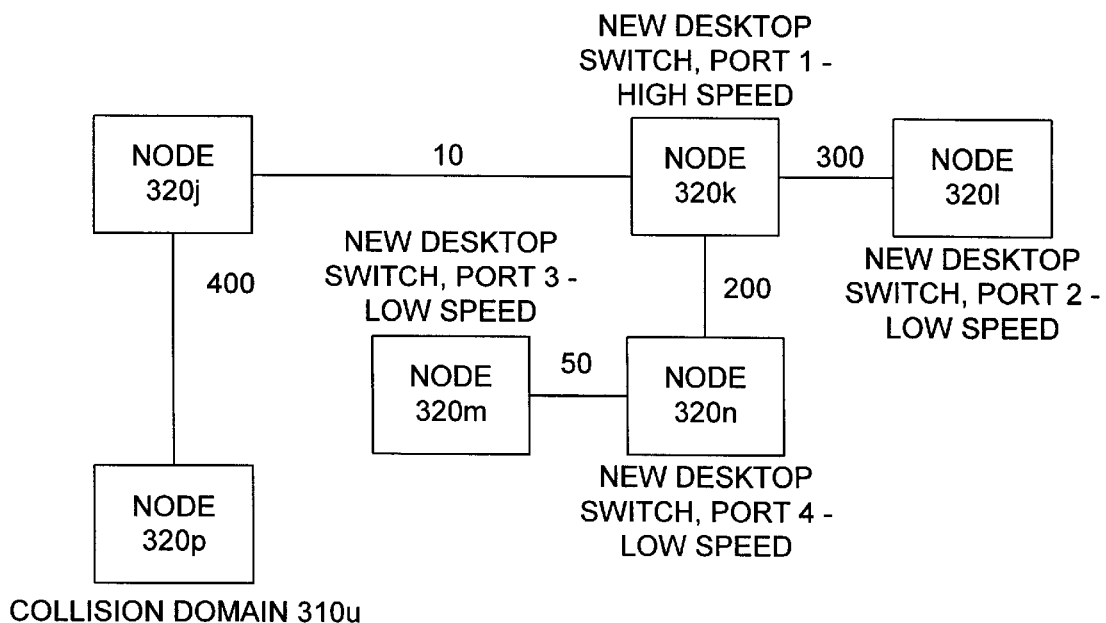
FIG. 11 shows the final recommendation to split collision domain 310u into a shared collision domain and a desktop switched domain.
Figure 12:
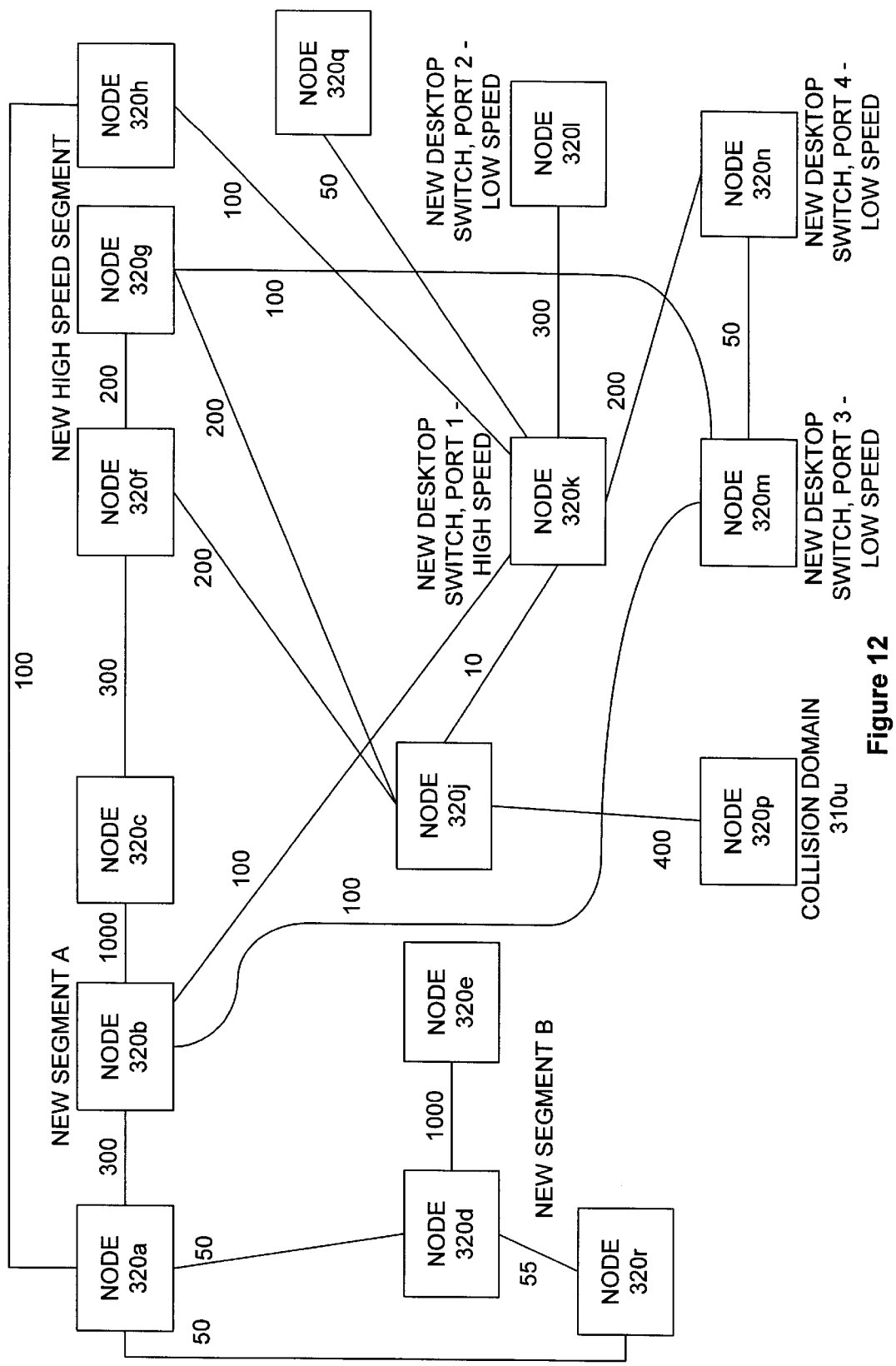
FIG. 12 shows the resulting network topology once all recommendations have been implemented.

Referring to FIG. 10, two workgroups have been identified for this collision domain, 500*y* and 500*z*. They represent 300 bytes and 500 bytes of the collision domain's original 910 internal bytes, which is well above the 10% limit. Furthermore, they only have 10 bytes crossing between the two workgroups, well below the 20% restriction. Further assume that for the time period being analyzed, workgroup 500*y* is under the 11% threshold specified in FIG. 1F but workgroup 500*z* is not. Therefore, the next step in the optimization algorithm is to attempt to further divide workgroup 500*z* into two smaller workgroups. This is done by creating a new workgroup for each node in workgroup 500*z*. New workgroup 500*a*1 holds only node 320*k*, new workgroup 500*a*2 holds only node 320*l*, and new workgroup 500*a*3 holds only node 320*n*.

Following the previously described steps, these three workgroups are combined into two. Choosing the workgroup with the smallest number of members is random since all workgroups have only one node. Let's say we pick workgroup 500*a*1 as the smallest workgroup. The workgroup that it talks with the most is workgroup 500*a*2 since workgroup 500*a*2 holds node 320*l* and node 320*k* talks with node 320*l* 300 bytes, as opposed to talking only 200 bytes with node 320*n*. Therefore, these two workgroups are combined.

When trying to compute whether the two new workgroups have too much external traffic, we find that workgroup 500*a*3's external traffic consists of 200 bytes while its internal traffic consists of zero. Obviously, there would be too much traffic across a switch, bridge or router to justify this kind of division and so they are recombined into the original workgroup 500z, as per the directions in step 285.

FIGS. 1E and 1F return to FIG. 1D. Step 250 tells us that we have more than one workgroup so we proceed to step 253. However, workgroup 500z is over the threshold for recommendations but cannot be split any further (step 253). Therefore, workgroup 500z's nodes must be placed on either a desktop switch or a faster speed shared media (step 257). To determine which, try to decide the outcome of making the workgroup desktop switched. All of the 500 bytes in workgroup 500z involve node 320k. Therefore, the best alternative to a further workgroup spilt is to place workgroup 500z on a desktop switch with nodes 320n and 320l on a slow dedicated port and node 320k on a fast dedicated port. Furthermore, workgroup 500y, which is not over utilized, follows the directions in step 254 to become its own collision domain. Finally, as a removed global talker residing on a collision domain which is being optimized into new collision domains, a new workgroup is created for node 320m indicating that it will be placed on its own dedicated slow speed port. It is placed on a dedicated port because it has to talk with several other collision domains: it is placed on a slow speed port because node 320m only contributes a relatively small number of bytes to the overall network byte count. Therefore, the final suggestion (see FIG. 11) for collision domain 310u is that nodes 320j and 320p will be placed on their own shared collision domain. Nodes 320m, 320l, and 320n should be placed on each of their own slow speed ports. Node 320k should be placed on its own high speed port.

Figure 1H:
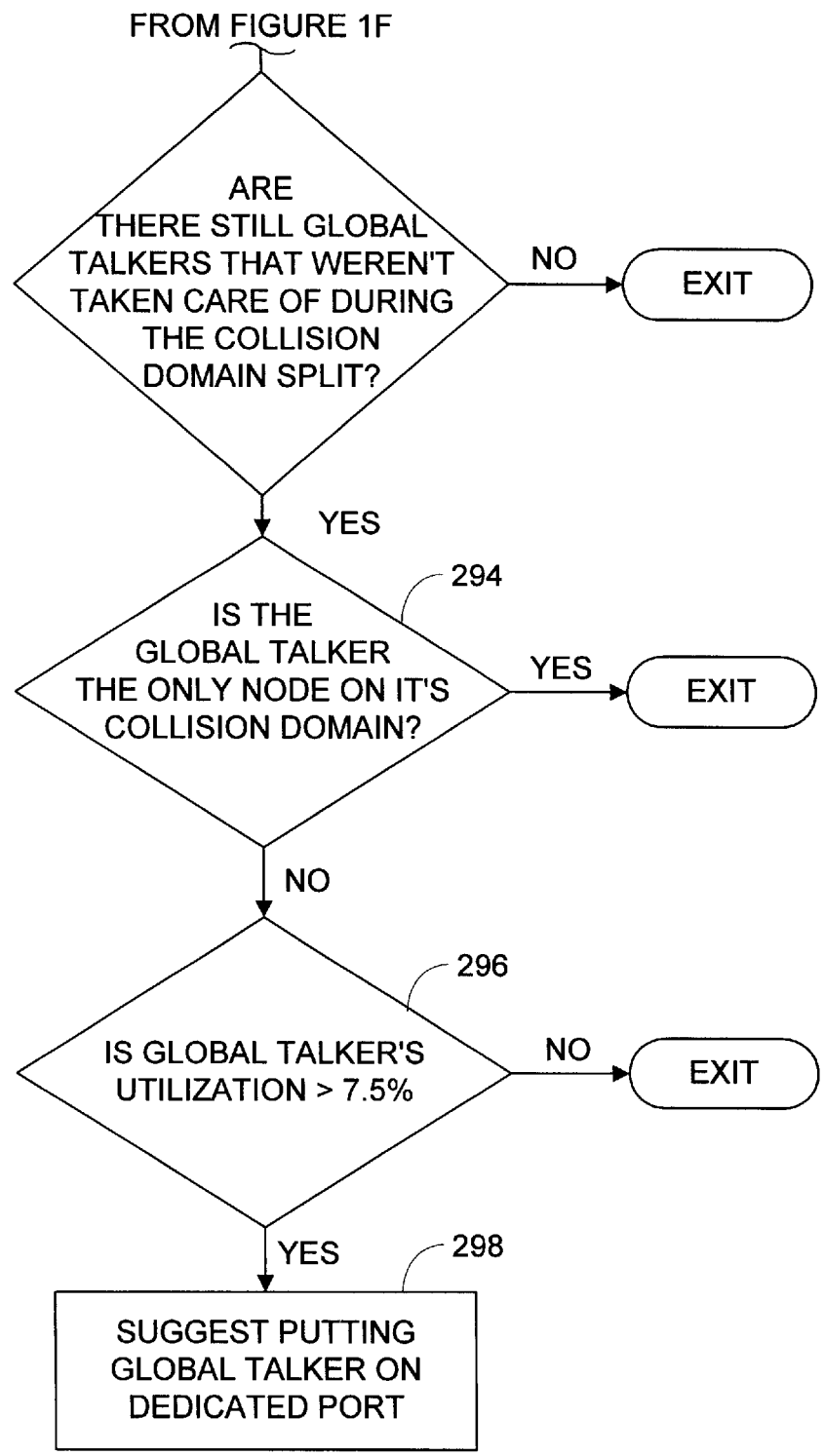
FIG. 1H shows a flowchart detailing the handling of global talkers (steps 212 and 214 of FIG. 1A.)

As a final step, those global talkers that were removed in the very first step are considered again (steps 212 and 214 of FIG. 1A). If there are any global talkers left whose collision domains were not already involved in a suggestion, they are considered now. FIG. 1H specifies the flowchart for FIG. 1A's steps 212 and 214. In step 294, global talkers that are alone on a collision domain are skipped because global talkers belong on dedicated ports and if it is already on a dedicated port, we want to leave it alone. If any global talker who is on a multi-node collision domain is involved in traffic conversations exceeding half the over utilization threshold (step 296), it should be moved to its own dedicated port (step 298), with a slow or fast media speed depending on how much traffic they are involved in.

In our example, all collision domains were involved in some kind of suggestion so the global talkers on each collision domain were handled at the time of the collision domain's recommendation. Otherwise, they would have been handled at the end, leaving the unchanged collision domain as is and moving its global talker dedicated port if it is involved in more than 7.5% (half) of the allowable utilization (15%) on that collision domain. The final recommended new topology appears in FIG. 12.

Figure 13:
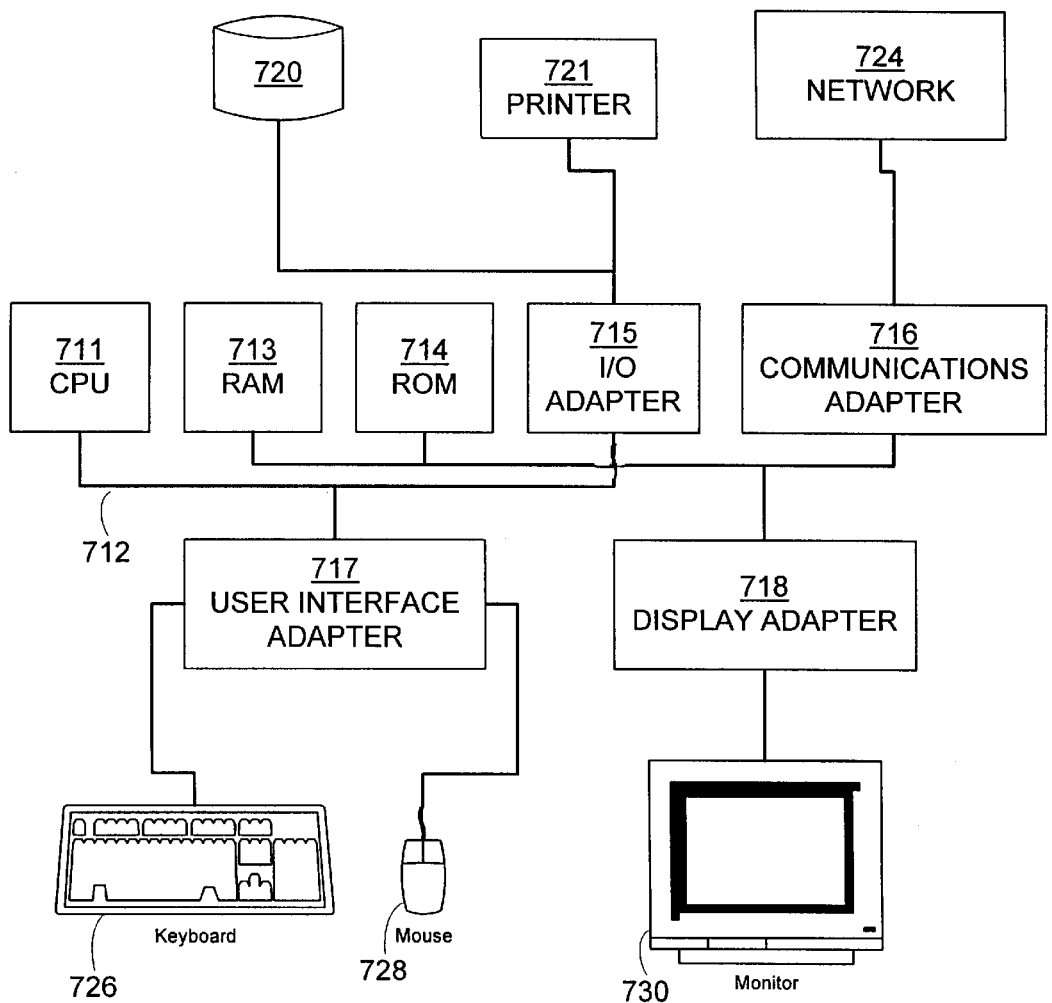
FIG. 13 is a high-level block diagram of a computer system adapted to execute the optimization algorithm according to the present invention.

FIG. 13 is a high-level block diagram of a computer system adapted to execute the optimization tool algorithm according to the present invention. Central processing unit 711 is coupled to bus 712, which in turn is coupled to random access memory (RAM) 713, read only memory (ROM) 714, input/output (I/O) adapter 715, a communications adapter 716, user interface adapter 717, and display adapter 718.

CPU 711 may be any general purpose CPU. RAM 713 and ROM 714 hold user and system data and programs as is well known in the art. I/O adapter 715 connects storage devices, such as hard drive 720, to the computer system. Communications adapter 716 couples the computer system to a network 724. User interface adapter 717 couples user interface devices, such as keyboard 726 and pointing device 728, to the computer system. Finally, display adapter 718 is driven by CPU 711 to control the display on display device 730.

As is well known in the art, the optimization tool embodying the present invention resides on a storage medium, preferably hard drive 150 and executes on a CPU. The optimization tool recommends splitting of collision domains in a network under consideration. The optimization tool is typically written in software and is adapted for use on a computer system having a CPU and memory. The recommendations for splitting of collision domains asserted by the optimization tool may be displayed or printed.

It is understood that the above description is intended to be illustrative and not restrictive. For example, the threshold values recited in the specification may vary dependent on the requirements of the network. The scope of the invention should therefore not be determined with reference to the appended claims, along with the full scope of equivalents to which such claims are entitled.

What is claimed is:

1. A method for optimizing a computer network topology having nodes grouped in at least one collision domain, including the steps of:

collecting traffic pattern data for each node in the computer network;

identifying and removing global talkers that are not inextricably tied to a single node in the network from an analysis;

creating workgroups of nodes based on traffic pattern data without the removed global talkers being considered;

including previously removed global talkers back into the analysis; and suggesting that each global talker on a multi-node collision domain having a utilization on its collision domain over a defined percentage be moved to its own dedicated port.

2. The method of claim 1 further comprising:

suggesting that each global talker on a multi-node collision domain having a utilization on its collision domain equal to or less than the predefined percentage remain on a shared port.

3. The method of claim 1 further comprising:

suggesting, for each global talker being moved to its own dedicated port, a media speed for the global talker based on an amount of traffic involving the global talker.

4. The method of claim 1 wherein the defined percentage is approximately half of a defined allowable total utilization of all the nodes on the multi-node collision domain.

5. The method of claim 1 wherein the defined percentage is approximately 7.5 percent.

6. The method of claim 1 wherein a global talker being inextricably tied to a single node is defined as the single node having more than a defined threshold of its traffic directed to or from the global talker.

7. The method of claim 6 wherein the defined threshold is approximately 70 percent.

8. A method of optimizing a computer network topology having nodes grouped in at least one collision domain, the method comprising:

collecting traffic pattern data for each node in the computer network;

identifying and removing global talkers that are not inextricably tied to a single node in the network from an analysis;

creating workgroups of nodes based on traffic pattern data without the removed global talkers being considered, wherein each created workgroup is associated to a collision domain and, if possible, sufficient workgroups are created to have all created workgroups have an internal utilization less than or equal to a defined percentage.

9. The method of claim 8 wherein the creating the work groups includes:

removing nodes from workgroups that are not on the workgroup's associated collision domain.

10. The method of claim 8 wherein the workgroups are created on collision domains having a utilization over a defined threshold.

11. The method of claim 10 wherein the defined threshold is user defined.

12. The method of claim 10 wherein the defined threshold is approximately 15 percent.

13. The method of claim 8 wherein the define percentage is user defined.

14. The method of claim 8 wherein the defined percentage is approximately 11 percent.

15. The method of claim 8 wherein devices for connecting or extending collision domains are not considered nodes for the optimization analysis.

16. The method of claim 8 wherein the creating the work groups includes:

evaluating the ratio of each workgroup's traffic to its associated collision domain's internal traffic.

17. The method of claim 8 wherein the creating the work groups includes:

evaluating the ratio of each workgroup's external traffic to its internal traffic.

18. The method of claim 8 further comprising:

if after creating the workgroups a collision domain has only one workgroup, suggesting moving the collision domain to a desktop switch or upgrading the whole collision domain to a faster speed media.

19. The method of claim 8 further comprising:

if after creating the workgroups, a workgroup cannot be split into additional workgroups yet has an internal utilization greater than the defined percentage, suggesting putting the workgroup's nodes on a desktop switch or on a shared media with a faster speed than its original collision domain.

20. A computer readable medium containing instructions for controlling a computer system to perform a method of optimizing a computer network topology having nodes grouped in at least one collision domain, the method comprising:

collecting traffic pattern data for each node in the computer network;

identifying and removing global talkers that are not inextricably tied to a single node in the network from an analysis;

creating workgroups of nodes based on traffic pattern data without the removed global talkers being considered, wherein each created workgroup is associated to a collision domain and, if possible, sufficient workgroups are created to have all created workgroups have an internal utilization less than or equal to a first defined percentage;

including previously removed global talkers back into the analysis; and suggesting that each global talker on a multi-node collision domain having a utilization on its collision domain over a second defined percentage be moved to its own dedicated port.

* * * * *